P. J. MULLOY.
GRAIN AND HAY LOADING AND TRANSPORTING MACHINE.
APPLICATION FILED SEPT. 4, 1906.
1,002,737.
Patented Sept. 5, 1911.
3 SHEETS—SHEET 3.
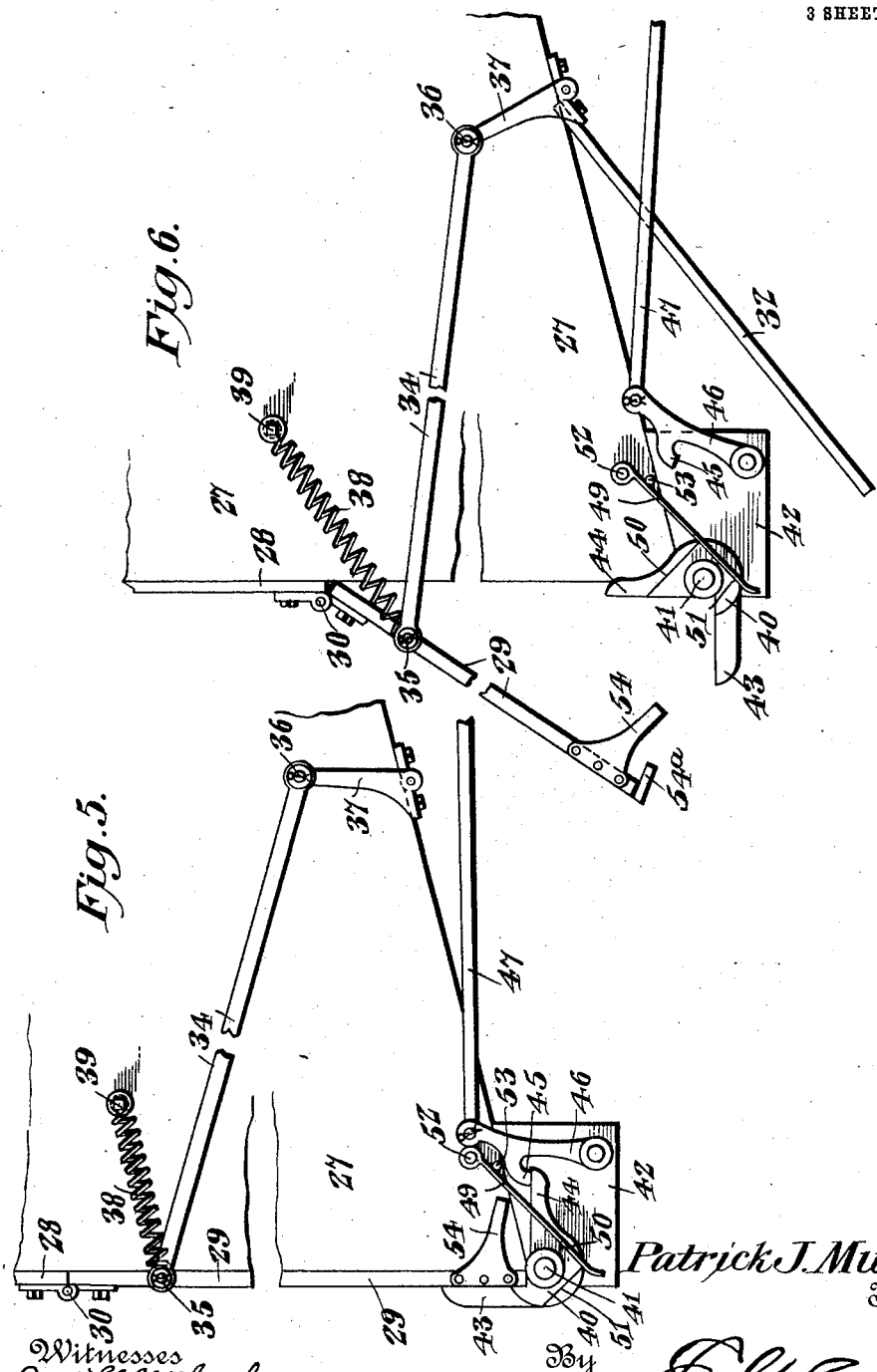
Patrick J. Mulloy,
Inventor
Witnesses
By
Attorney

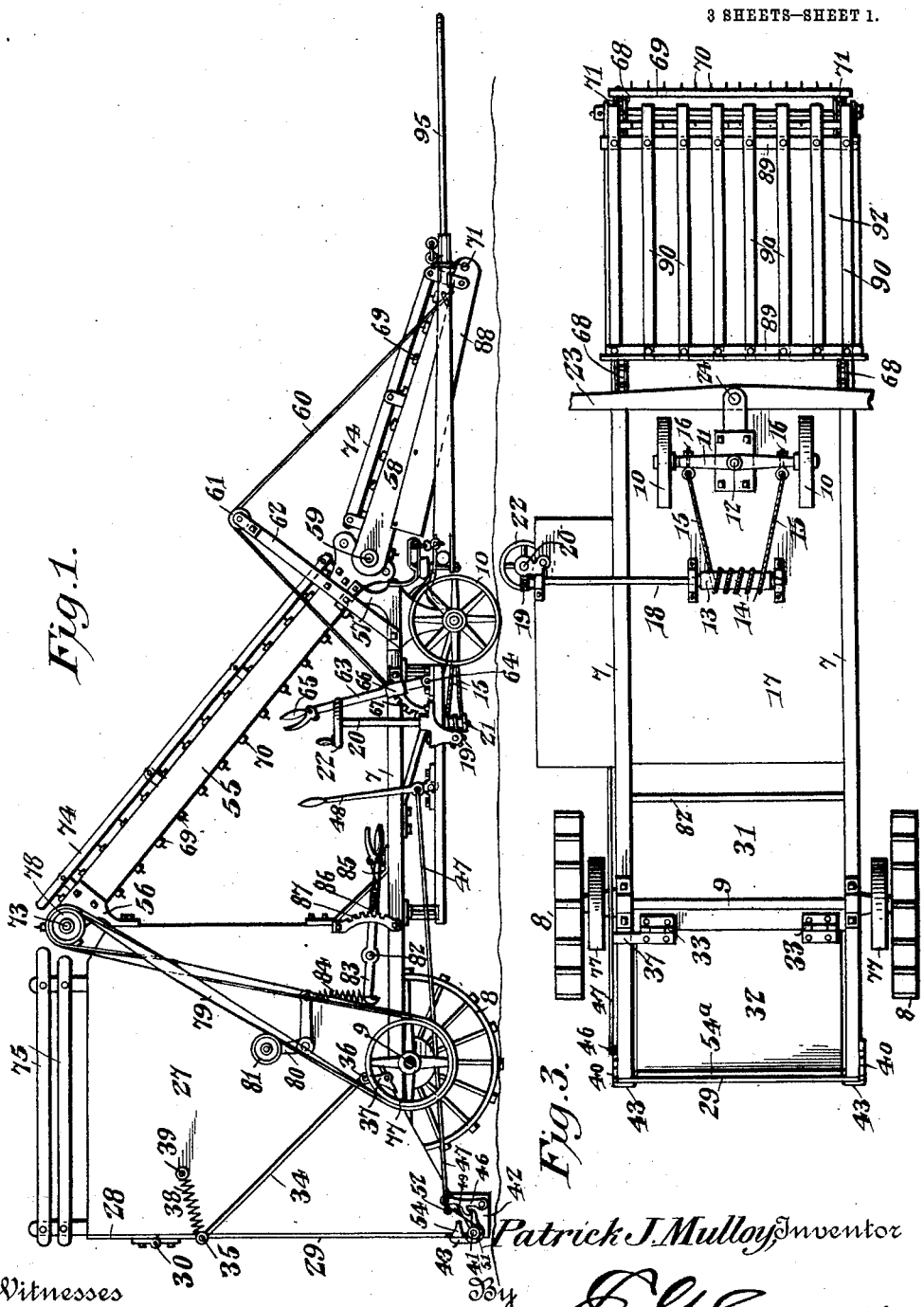

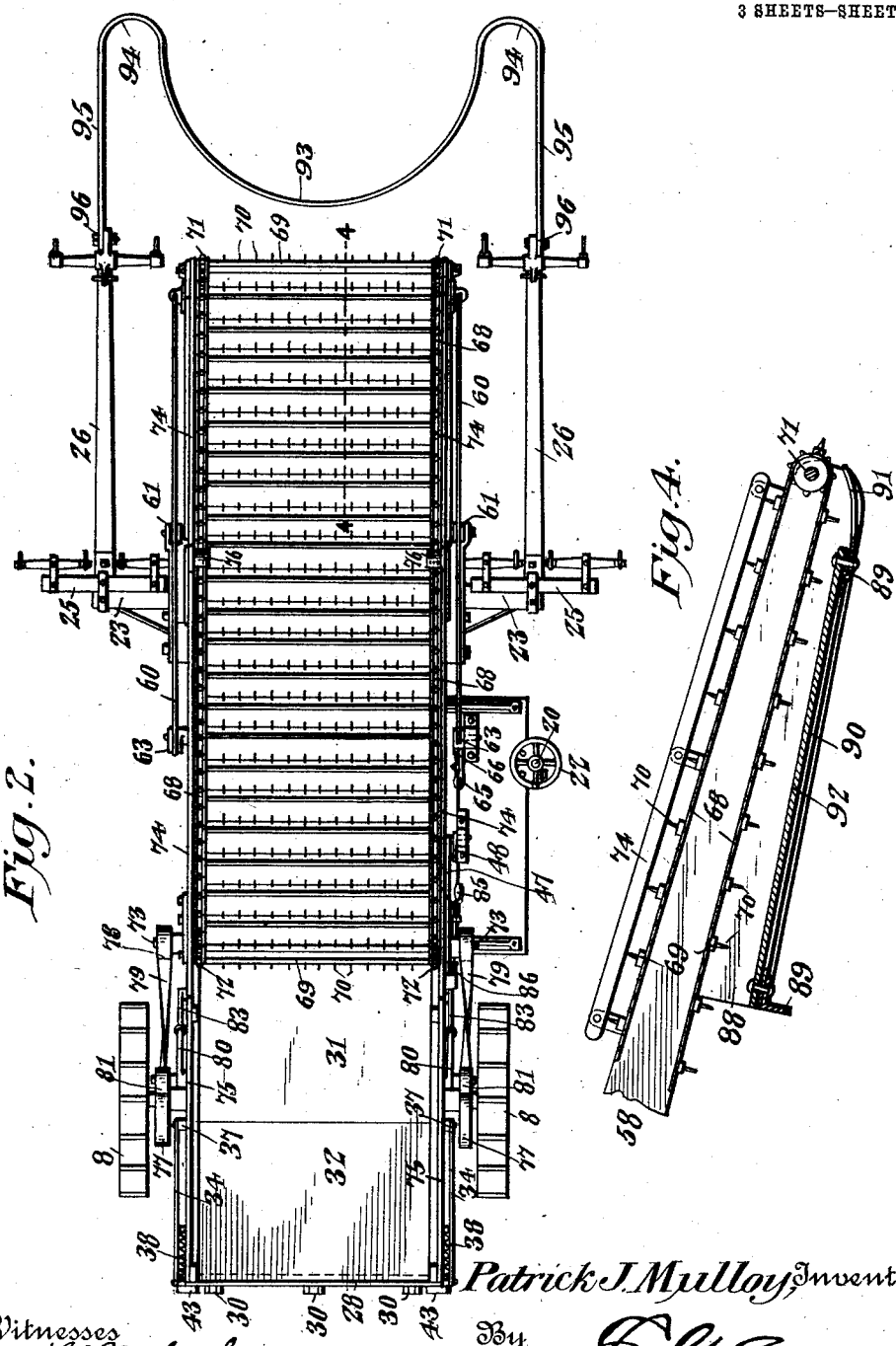

UNITED STATES PATENT OFFICE.

PATRICK J. MULLOY, OF GRAND FORKS, NORTH DAKOTA.

GRAIN AND HAY LOADING AND TRANSPORTING MACHINE.

1,002,737.  Specification of Letters Patent.  Patented Sept. 5, 1911.

Application filed September 4, 1906. Serial No. 333,108.

*To all whom it may concern:*

Be it known that I, PATRICK J. MULLOY, a citizen of the United States, residing at Grand Forks, in the county of Grand Forks and State of North Dakota, have invented a new and useful Grain and Hay Loading and Transporting Machine, of which the following is a specification.

This invention relates more particularly to means for gathering grain, hay, or the like material in the fields and transporting the same in bulk to a place of deposit.

One of the important features of the invention resides in a holder or receptacle for the gathered material, and the provision of novel, simple and effective means for discharging the contents of such holder or receptacle.

One embodiment of the invention is disclosed in the accompanying drawings and the following specification, but an inspection of the claims hereto appended will clearly indicate that said invention is not limited to the exact structure herein set forth.

In the drawings:—Figure 1 is a side elevation of the machine. Fig. 2 is a top plan view of the said machine. Fig. 3 is a bottom plan view of a portion of the same. Fig. 4 is a detail longitudinal sectional view on the line 4—4 of Fig. 2. Fig. 5 is a detail elevation on an enlarged scale of the mechanism for controlling the discharge of the contents from the receptacle or holder, and illustrating the same in operative position. Fig. 6 is a similar view, showing the receptacle open.

Similar reference numerals designate corresponding parts in all the figures of the drawings.

In the particular embodiment disclosed, a suitable frame 7 is employed, the rear portion of which is supported on traction wheels 8 having a rotatable axle 9 rigidly secured thereto and journaled on the frame. The front portion of the frame is supported upon wheels 10, journaled on a swinging axle 11, pivoted, as shown at 12, between its ends. Suitable steering mechanism is connected with this axle. For instance, in the present embodiment a drum 13 has a cable 14 wrapped thereupon and the ends 15 of the said cable are connected, as shown at 16, to the axle 11 on opposite sides of the pivot 12. The drum is journaled upon the underside of a platform 17, mounted on an intermediate portion of the frame, and one end of the said drum carries a suitable shaft 18 that extends to one edge of the platform, where it is provided with a worm wheel 19. An upright shaft 20 has a worm 21 at its lower end, which worm meshes with the wheel 19. The upper end of the shaft 20 is provided with a suitable hand wheel 22. Thus by turning the wheel 22, it will be evident that the machine may be guided as desired.

While any suitable means may be employed for effecting the movement of the machine, the present embodiment is designed to be moved by draft animals, and for this purpose an evener bar 23 is pivoted, as shown at 24, beneath the platform 17 and extends beyond the opposite sides of the frame 7. Suitable whiffletrees 25 and tongues 26 are connected to the ends of the evener bar, any number of whiffletrees being employed as is found necessary or desirable for the purpose.

Upon the rear portion of the frame and over the rear axle 9, is located a holder or receptacle, the same comprising suitable side and front walls 27, a rear wall and a downwardly inclined bottom. The rear wall comprises an upper fixed section 28, and a lower door 29, the latter being hinged at its upper edge to the lower end of the fixed section, as shown at 30. The bottom comprises a downwardly and rearwardly inclined front fixed section 31 and a rear inclined trap door 32, hinged at its front edge, as shown at 33, to the rear edge of the section 31. As a result, it will be evident that the free edges of the doors 29 and 32 are disposed adjacent to each other when in closed positions. The two doors are connected by a link 34, pivoted, as shown at 35, to one edge of the rear door 29 a slight distance below the hinge 30, the other end of the said link being pivoted, as shown at 36, to the upper end of an upstanding crank arm 37 secured to the hinged margin of the trap door 32. Thus it will be evident that the doors must swing together, and when the rear door 29 moves rearwardly to an open position, the trap door 32 will swing downwardly, as clearly shown in Fig. 6. The doors, however, are yieldably urged to their closed position by a coiled spring 38, one end of which is connected to a pivot 35, the other end being secured by a suitable bolt 39 to the adjacent side of the holder or receptacle.

For the purpose of normally locking the doors in closed position, the following mechanism is preferably employed: A bell crank lever 40 is fulcrumed, as shown at 41, upon a depending support 42 carried by the frame of the machine. This bell crank lever has an upstanding arm 43 that is arranged to engage the rear lower side of the door 29, while a horizontally disposed arm 44 is engaged by the overhanging tooth 45 of a latch 46, pivoted on the support 42. A link 47 connected to the upper end of the latch 46 has a connection with a suitable actuating lever 48, fulcrumed on the platform 17. Thus it will be evident that as long as the tooth 45 of the latch 46 is over the arm 44, the bell crank lever cannot swing, and the door 29 will be held against its opening movement, consequently maintaining the trap door 32 closed. The bell crank 43 is arranged to be held in either of two positions by a leaf spring 49, secured to the side of the holder or receptacle and having its free portion arranged to bear against either of the two angularly disposed flat faces 50 and 51, formed upon the bell crank lever 40. The spring 49 is fastened at one end by a suitable bolt or pin 52, and directly adjacent to said pin it has a bearing against a projecting lug 53, as clearly shown in Figs. 5 and 6. Thus it will be evident, as illustrated in Fig. 6, that when the doors are open, the arm 43 will be in horizontal position, while the arm 44 will be in a vertical position. Under closing movement, however, the said arm 44 is arranged to be engaged and returned to its horizontal position by a finger 54, secured to the lower portion of the door 29, the path of movement of the end of said finger being intersected by the arm. In actual practice the lower edge of the door 29 is preferably provided with an inwardly extending flange or lip 54ª that engages beneath the free edge of the trap door 32.

An endless conveyer is employed for elevating the material from the ground into the receptacle or holder. To this end an inclined frame 55 has its upper end fastened by brackets 56 to the front upper corner of the receptacle, while its lower end is supported on brackets 57, secured to the front end of the main or body frame 7. Another frame 58, pivoted as shown at 59 to the lower front end of the frame 55, projects in advance of the same and in advance of the frame 7, being capable of a vertical swinging movement. This swinging movement is accomplished by means of cables 60, connected with the front ends of the frame 58 at opposite sides thereof, which cables pass over sheaves 61 at the upper end of posts 62 secured to the frames 7 and 55. These cables have their rear ends fastened to levers 63, carried by a rock shaft 64 that is journaled on the front portion of the platform 17. One of the levers is extended and provided with a handle at 65, and said lever is provided with a suitable dog 66 coöperating with a quadrant rack 67. By swinging the handle lever, it will thus be evident that the frame 58 may be raised or lowered as desired. An endless belt is mounted on the frames 55 and 58 and consists of side chains 68, connected by cross slats 69 that are provided with outstanding teeth 70. The chains 68 pass around sprocket wheels 71, journaled on the front end of the frame 58 and also pass around other sprocket wheels 72, carried by a shaft 73 that is journaled on the upper end of the frame 55 directly over the front upper corner of the receptacle. Guard strips 74 may be carried by the opposite sides of the frames 55 and 58, and corresponding strips 75 are preferably mounted on the sides of the receptacle. Guide rollers 76 are also preferably journaled on the lower end of the frame 55 over the chains 68, and directly contiguous to the connection between the frame 55 with the frame 58.

In this particular embodiment of invention, the conveyer is driven from the traction axle 9, and to this end, said axle has pulleys 77 mounted on opposite sides of the holder or receptacle. Other pulleys 78 are fixed to the ends of the upper shaft 73 of the conveyer, and crossed belts 79 pass about the corresponding pulleys 77 and 78. The belts are made comparatively loose, so that unless tightened, the axle 9 will rotate without motion being transmitted to the shaft 73, but means are provided for tightening these belts. This means consists of bell crank levers 80, fulcrumed upon the opposite sides of the holder or receptacle and have idler pulleys 81 that engage the belts 79. A rock shaft 82 extends across the receptacle beneath the bottom, and arms 83 connected to the said shaft, have spring connections 84 with the bell cranks 80. One of these arms is extended to form an actuating lever 85 that carries a dog 86, which coacts with a rack 87. By operating the lever 85 therefor, the belts may be loosened or tightened as desired. The lever 85, it will be observed, is disposed adjacent to the other controlling devices already described.

It will be evident by reference to Fig. 1 that the front end of the conveyer operates in close proximity to the ground, and in order to avoid interference between the moving belt and the ground or obstacles that may be thereupon, runner blades 88 are secured to the sides of the frame 58 and extend below the same and below the path of movement of the pins 70 of the slats 69.

Furthermore cross bars 89, shown more particularly in Figs. 3 and 4, are arranged beneath the belt and have spaced runner strips 90 secured thereto, the front ends 91 of the said strips being upwardly curved and extending to points adjacent to the shaft carrying the sprocket wheels 71, but being disposed between the teeth 70. A guard plate 92 is fastened to the cross bars 89 and runner strips 91, being located over the same, the structure thus constituting an effective guard for the lower portion of the belt.

Operating in advance of the conveyer or elevator, is a positioning device, the same consisting of a rod or bar having a centrally disposed rearwardly bowed portion 93, arranged in front and centrally of the frame 58. From the ends of this bowed portion, the rod is reversely curved, as shown at 94, and extends rearwardly in the form of straight side arms 95, suitably secured as illustrated at 96 to the front ends of the tongues 26, being thus supported thereby.

The operation of the machine may be briefly outlined as follows: As the machine is propelled forwardly by the draft animals hitched to the whiffletrees 25, an operator on the platform 17 can readily direct the movement of said machine by the hand wheel 22, as already explained. The machine is thus driven forward and guided so that the bowed portion 93 of the positioning device will strike a shock, bundle or stack of grain, hay or like material and overthrow the same, at the same time centering it with respect to the conveyer. The conveyer being in operation will pick up the material thus overturned and will elevate it into the holder or receptacle. The height of the front end of the conveyer or elevator can, of course, be readily varied by operating the lever 63 and the positioning device 93 will be automatically maintained at the proper elevation by the draft animals supporting the tongue. After the receptacle or holder has been filled, the machine is driven to the place where the material is to be deposited, as for instance in the case of grain, at a threshing machine, and during its progress the elevating mechanism may be stopped by loosening the belts 79, and in like manner in order to avoid all possible interference, the front section of the elevator 58 may be raised. Having reached the place at which the grain or hay is to be discharged, the operator has only to move the lever 48 forwardly, thus disengaging the latch 46 from the bell crank 43. The weight of the material against the doors 29 and 32 will cause said doors to open against the resistance of the spring 38 and the contents will consequently gravitate from the receptacle. As soon as the discharge has taken place, the spring 38 will react to again close the doors and swing the bell crank 40 to a position so that the latch 45 will reëngage thereover. The machine is now ready for another filling operation.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

I regard as one of the salient features of my invention the employment of a holder or receptacle having an inclined bottom, whether the latter is in the form of a swinging structure or is rigidly mounted.

While the conveyer structure and shock overturning means are shown and described, no claim is made for this structure herein.

Having thus fully described my invention, what I claim as new and desire to secure by Letters Patent, is:—

1. In a machine of the character described, the combination with a movable support, of a holder or receptacle mounted on said support and having a discharge opening, a movable closure for said discharge opening, a bell crank lever having one arm that engages the closure to maintain the same in its closed position, a latch that engages the other arm of the bell crank lever to hold it against movement, and means for conveying material to the holder or receptacle.

2. In a machine of the character described, the combination with a movable support, of a holder or receptacle mounted on said support, a swinging door for said receptacle, a bell crank lever having one arm that engages the door to hold it against its swinging movement, a swinging latch detachably engaging the other arm of the lever for preventing its swinging movement, means for actuating the latch, said lever having angularly disposed faces, a spring arranged to bear against either face for holding the lever in different positions, a finger carried by the door and engaging one arm of the lever for swinging said lever, and elevating means mounted on the support for introducing material into the holder or receptacle.

3. In a machine of the character described, the combination with a movable support, of a holder or receptacle mounted on said support, and having a discharge opening, a movable closure for said discharge opening, means for yieldably maintaining said closure in its closed position and resisting its opening movement, means for positively locking the closure in its closed position, and means for conveying material to the holder or receptacle.

4. In a machine of the character described, the combination with a movable support, of a holder or receptacle mounted on said support and having a lower discharge opening, a swinging door controlling said discharge opening, a spring associated with the door for holding it in its closed position, latch mechanism coöperating with the lower end of the door for positively holding it in its closed position, means for actuating the latch mechanism, and means for conveying material to the holder or receptacle, said latter means being mounted on and movable with the support.

5. In a machine of the character described, the combination with a wheeled supporting frame, of a holder or receptacle mounted on the rear portion thereof and having a rear lower discharge opening, a swinging door controlling said discharge opening, a spring engaged with the door for yieldably holding it in its closed position and resisting the opening movement, a bell crank lever located at the lower end of the receptacle and having one of its arms engaging the door to hold it in closed position, a latch that engages the other arm of the lever to prevent the swinging movement of the said lever, actuating means for the latch mounted on the frame, and conveying mechanism extending from the front portion of the frame to the top of the holder or receptacle, said conveying mechanism being mounted on and movable with the frame.

6. In a machine of the character described, the combination with a movable support, of a holder or receptacle mounted thereon and having a plurality of movable closures, a connection between the closures for effecting their simultaneous movement, means directly engaging one of the closures for holding said closures in their closed positions, and means for introducing material into the holder or receptacle.

7. In a machine of the character described, the combination with a movable support, of a holder or receptacle mounted thereon and having a plurality of angularly disposed swinging doors, a link connecting the doors for effecting their simultaneous swinging movements, common locking means for holding the doors against movement, and conveying mechanism mounted on the movable support and delivering to the holder or receptacle.

8. In a machine of the character described, the combination with a movable support, of a holder or receptacle mounted thereon, a rearwardly swinging door associated with the receptacle and hinged at its upper end, a downwardly swinging door hinged at its front end, an arm carried by the latter door, a link directly connecting the arm and the other door, locking mechanism for holding the doors against their swinging movements, means for actuating the locking mechanism to free the doors, and means for introducing material into the holder or receptacle.

9. In a machine of the character described, the combination with a movable support, of a holder or receptacle mounted thereon, a rearwardly swinging door for the receptacle hinged at its upper end, a downwardly swinging door for the receptacle hinged at its front end, said doors having detachably interlocked free ends, means for locking the doors in closed positions, and means mounted on the support for delivering material to the holder or receptacle.

10. In a machine of the character described, the combination with a movable support, of a holder or receptacle mounted thereon, a downwardly swinging door hinged at its front end to the receptacle, a rearwardly swinging door hinged at its upper end to the receptacle, said doors having coacting free ends, and the rearwardly swinging door having a flange at its lower end that engages beneath the rear of the downwardly swinging door, means for positively locking the doors against their swinging movement, and means for delivering material to the holder or receptacle.

11. In a machine of the character described, the combination with a movable support, of a holder or receptacle carried by the support, downwardly and rearwardly swinging doors associated with the holder or receptacle, a link connection between the doors for effecting their simultaneous movements, a bell crank lever having an arm that engages one of the doors, a swinging latch that engages the other arm of the lever to prevent the movement of said lever, means for swinging the latch, and elevating mechanism mounted on and movable with the support for delivering material to the holder or receptacle.

12. In a machine of the character described, the combination with a wheeled frame, of a receptacle mounted on the rear portion of the wheeled frame, said receptacle having a rear wall that includes a rearwardly swinging door, a downwardly inclined bottom that includes a downwardly swinging door, the door of the rear wall having a flange that engages beneath the rear end of the downwardly swinging door, a link connecting the doors for effecting their simultaneous movements, a spring associated with the rearwardly swinging door for yieldably maintaining said doors in closed positions and resisting their opening movements, a bell crank lever having an arm that engages the lower portion of the rearwardly swinging door, a swinging latch that engages the other arm of the bell crank lever for preventing its movement, a spring associated with the bell crank lever for holding it in a plurality of positions, actuating means for swinging the latch, and conveyer mechanism mounted on the frame and delivering to the holder or receptacle.

13. In a machine of the character described, the combination with a movable support, of a holder or receptacle mounted on and movable with said support and having a discharge opening, oppositely swinging doors constituting a closure for said opening, connections between the doors for effecting their simultaneous movements in opposite directions, a holding device mounted on the holder or receptacle for maintaining the closure in its closed position, a latch also mounted on the holder or receptacle for detachably engaging the holding device, means located at a point remote from the holder or receptacle for releasing the latch, and means carried by and movable with the support for conveying material to the holder or receptacle.

14. In a machine of the character described, the combination with a movable support, of a holder or receptacle mounted on said support and having a discharge opening, a movable closure controlling said discharge opening, a holding device mounted on the holder or receptacle for maintaining the closure in its closed position, a latch also mounted on the holder or receptacle for detachably engaging the holding device, means located at a point remote from the holder or receptacle for releasing the latch, and means for conveying material to the holder or receptacle.

15. In a machine of the character described, the combination with a movable support, of a holder or receptacle mounted thereon and having a downwardly swinging inclined bottom and an outwardly swinging rear door, said door swinging from a pivot remote from the bottom and said bottom swinging from a pivot remote from the rear door, both said door and said bottom having their free ends meeting at a common point, connections between the bottom and door for effecting their simultaneous movements in opposite directions, means for locking said bottom and said door against outward movement, said locking means being located at the free ends of said bottom and said door, means mounted on the support and connected to said locking means for releasing the same, and means for elevating the material into the holder or receptacle.

In testimony, that I claim the foregoing as my own, I have hereto affixed my signature in the presence of two witnesses.

PATRICK J. MULLOY.

Witnesses:
S. G. SKULASON,
P. S. HOUGHTON.

---

Copies of this patent may be obtained for five cents each, by addressing the "Commissioner of Patents, Washington, D. C."